United States Patent Office 3,388,539
Patented June 18, 1968

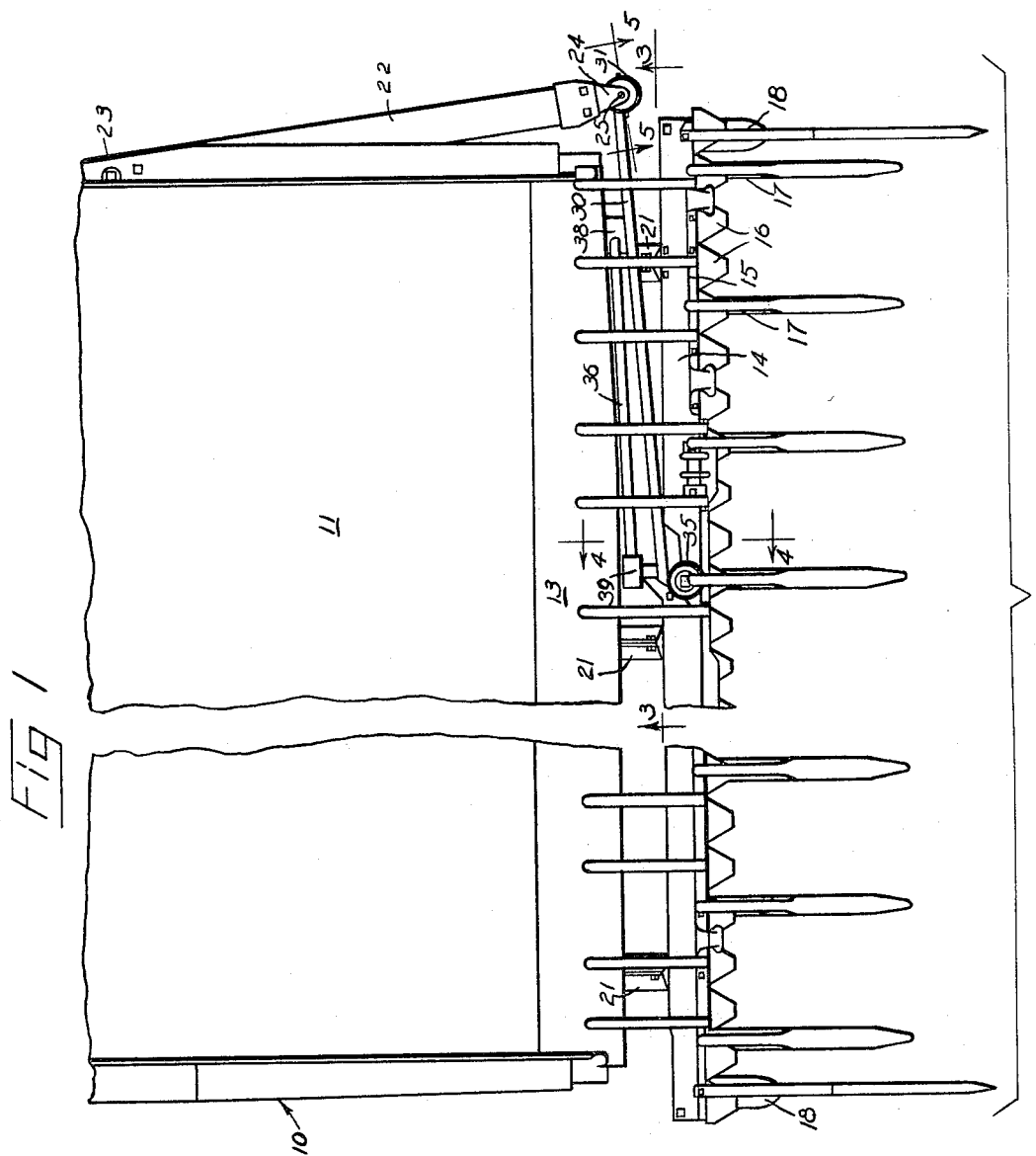

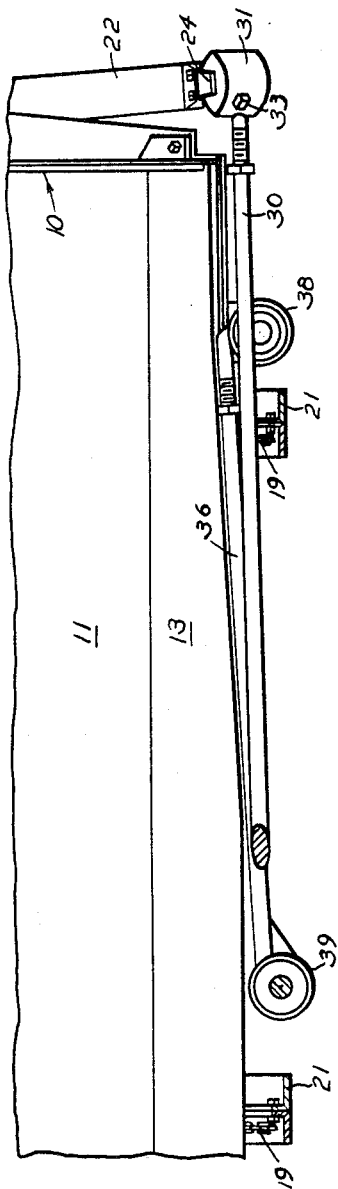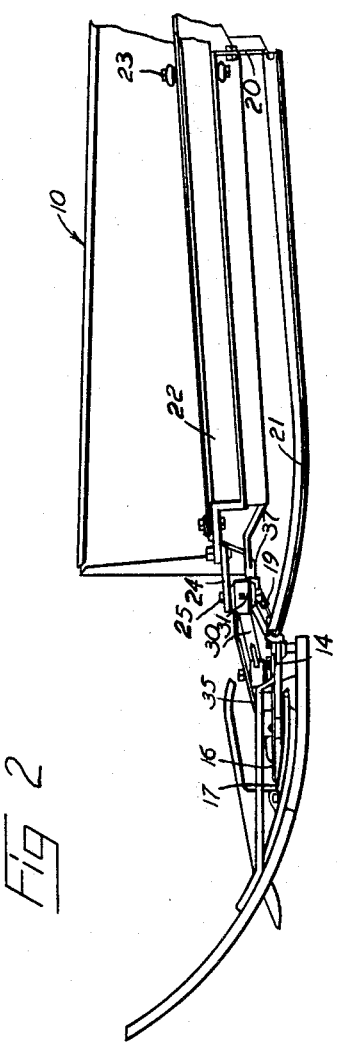

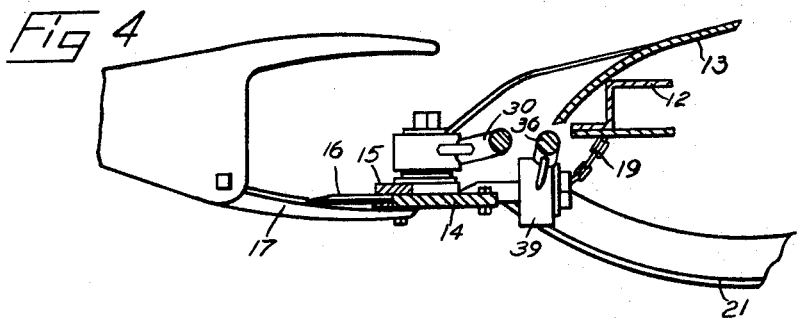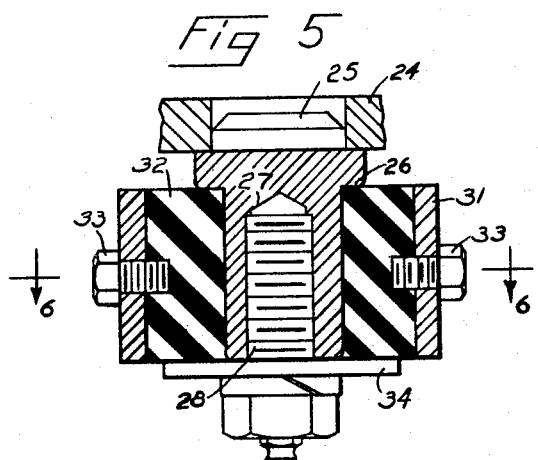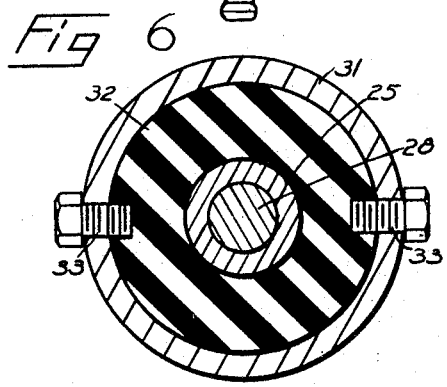

3,388,539
FLOATING CUTTER BAR MOUNT AND SICKLE DRIVE
Byron M. Novak, Mendota, Ill., assignor to Hart-Carter Company, Chicago, Ill., a corporation of Delaware
Filed May 3, 1965, Ser. No. 452,469
8 Claims. (Cl. 56—257)

ABSTRACT OF THE DISCLOSURE

A floating cutter bar mount and sickle drive are described for better accommodating the motion required of the cutter bar and sickle due to irregular variations in ground contour. A cutter bar and corresponding sickle are mounted transversely in front of a mobile framework for elevational movement. A pitman interconnects an oscillating drive means and the sickle. A stabilizer bar is mounted transversely in front of the framework interconnecting the stabilizer bar and the framework. The ends of the stabilizer bar are pivotally connected to the cutter bar and framework respectively through resilient bushings that permit vertical pivotal movement and limited twisting of the stabilizer bar. Likewise the ends of the pitman are pivotally connected to the oscillating drive means and the sickle through resilient bushing assemblies that permit horizontal pivotal movement and limited twisting of the pitman.

---

This invention relates to an improvement in a floating cutter bar mount and sickle drive for agricultural harvesters. It is concerned with the mounting and guiding of a floating cutter bar used at the front end of a harvester adapted to move elevationally relative to the contour of the ground over which the cutter bar travels. An earlier form of such a cutter bar is shown in the patent to H. D. Hume, No. 2,795,922.

The purpose of the present invention is to provide an improvement over earlier support and driving mechanisms for floating cutter bars so as to better accommodate the motion required of the cutter bar and sickle due to irregular variations in ground contour. The apparatus disclosed and claimed herein accommodates such movement by a novel combination of resilient bushing connections on both the driving pitman and a transverse stabilizer bar operatively connected between elements on the machine frame and elements on the floating cutter bar assembly.

One object of the invention is to provide a resilient coupling capable of allowing limited movement of elements on the cutter bar assembly due to changes in the elevation of the cutter bar assembly, eliminating binding or unnecessary wear on the coupling itself.

Another object of this invention is to provide unique coupling devices on the pitman and stabilizer bar that are designed for long life without frequent replacement, the couplings being oriented on the machinery so as to best accommodate the particular movement encountered by the parts coupled thereby.

These and further objects will be best understood from a study of the following disclosure taken in conjunction with the accompanying drawings which illustrate one preferred form of the invention. It is to be understood that this example is presented by way of illustration only and that the invention disclosed herein is defined only in the claims following the detailed specification.

In the drawings:
FIGURE 1 is a plan view looking down on the cutter bar assembly with the central portions of the cutter bar assembly being broken away;
FIGURE 2 is a side view taken from the right of FIGURE 1;
FIGURE 3 is an enlarged fragmentary sectional view taken along line 3—3 in FIGURE 1;
FIGURE 4 is an enlarged fragmentary sectional view taken along line 4—4 in FIGURE 1;
FIGURE 5 is an enlarged sectional view through a single coupling as seen along line 5—5 in FIGURE 1; and
FIGURE 6 is a sectional view taken along line 6—6 in FIGURE 5.

Referring to the drawings, and particularly FIGURES 1 through 4, the present invention is illustrated in connection with an agricultural harvester having a mobile supporting framework 10 carried in the usual manner. The framework 10 supports a longitudinal draper 11 which travels about a front roller and conveys the harvested crop rearwardly from the cutter bar assembly. The framework 10 includes a rigid front cross piece 12 that supports a curved shield 13 that extends over the front draper roller (not shown). The framework 10 also includes a rearwardly spaced transverse bar 20 for supporting the cutting apparatus for swinging movement elevationally with respect to the front end of the framework 10.

The cutter bar 14 extends transversely across the forward end of the main framework 10. It slidably supports a sickle 15 for reciprocable movement in a transverse direction relative to the intended direction of movement of the framework 10. The sickle 15 includes a plurality of forwardly protruding knives 16 which cooperate with sickle guards 17 fixed to the cutter bar 14 to cut the crop. The cutter bar 14 is elevationally guided by ground engaging shoes 18 at its respective ends. A plurality of chains 19 hang from the front cross piece 12 to the cutter bar 14 and serve to carry the cutter bar 14 when the main frame 10 has been elevated for travel purposes. The cutter bar 14 is rather loosely connected to the framework 10 by means of transversely spaced longitudinal springs 21 pivoted to the cutter bar 14 and to the transverse bar 20 of the framework 10. Longitudinal thrust is transmitted from the framework 10 to the cutter bar 14 through the springs 21. The springs 21 are also in ground contact (FIGURE 2).

In cutting crops, the cutter bar 14 is permitted to closely follow the contour of the ground above which it is traveling. The support wheels for the vehicle that carries the main framework 10 are usually spaced rearwardly from the cutter bar 14 and are not necessarily at the same elevation as the cutter bar 14. For this reason the cutter bar assembly as illustrated is known as a "floating cutter bar," it being supported on the framework 10 with sufficient apparatus to push it forwardly, while being free to move elevationally relative to the framework 10.

The sickle 15 is reciprocated by a sway bar 22 or walking beam pivotally connected to framework 10 about a shaft 23 and oscillated about the axis of shaft 23 by a conventional crank and drive assembly (not shown). The instant invention is concerned with the driving connection between the forward or outer end of the sway bar 22 and the sickle 15 and also the stabilization of cutter bar 14 relative to the framework 10 to resist motion that might otherwise be imparted to the cutter bar 14 due to reciprocation of sickle 15.

As shown, the outer end of the sway bar 22 is provided with a bracket 24 having a substantially upright shaft 25 fixed to it. The shaft 25, shown in details in FIGURES 5 and 6, includes an enlarged shoulder 26 and a coaxial threaded aperture 27 adapted to receive a bolt 28.

A pitman 30 extends between the bracket 24 on the sway bar 22 and the sickle 15, the length of the pitman 30 being extended a substantial distance across the width of the cutter bar 14. The rigid pitman 30 is longitudinally adjustable. The end of pitman 30 connected to sway bar 22 has fixed to it a cylindrical metal collar 31. Collar 31 receives a coaxial cylindrical bushing made of rubber or other suitable resilient material. The bushing 32 is fixed relative to collar 31 by one or more short bolts 33 extending through collar 31 and partially into the bushing 32. The bushing 32 frictionally engages the outer surface of shaft 25, which is fixed to the previously described bracket 24. The lower surface of the bushing 32 is frictionally engaged by an enlarged washer 34 held in place by the head of the bolt 28. Therefore, the resilient bushing 32 cannot turn relative to the collar 31 and pitman 30, but is free, when a sufficient turning force is exerted on the pitman 30, to pivot about the axis of shaft 25 due to the frictional engagement therewith. In addition, the resilient bushing 32 is free to accommodate limited angular movement of the pitman 30 and collar 31 relative to shaft 25 in various planes without increasing substantially the amount of wear on the supporting shaft 25 due to its frictional engagement therewith.

The remaining end of pitman 30 is connected to sickle 15 by another collar 35 fixed to the pitman 30. Collar 35 surrounds a bushing and shaft fixed to the sickle 15 having the same construction as the apparatus illustrated in detail in FIGURES 5 and 6.

A transversely extending stabilizer bar 36 is connected between the cutter bar 14 and a bracket 37 fixed to the cross piece 12 of framework 10. It also is provided with collars 38, 39 at the respective ends thereof which carry resilient bushings and shafts respectively fixed to the cutter bar 14 and bracket 37. Again, the details of these connections are identical to that illustrated in FIGURES 5 and 6.

As will be noted from the drawings, the axes of collars 31 and 35 on the pitman 30 are oriented in an upright and substantially vertical position. This is due to the fact that the driving connection from the sway bar 22 creates the most tendency for turning of the bushings within these collars 31, 35 and therefore the shafts mounted therein are oriented perpendicularly to this turning movement so that the bushings within collars 31 and 35 can pivot about the shafts when the angular rotation of the collars about the respective axes passes the limit at which the frictional resistance to such turning is overcome. Likewise, the axes of the collars 38, 39 are horizontal and parallel to the intended direction of movement of the framework 10 during operation of the harvester. Again, the greatest movement of cutter bar 14 is in a vertical direction, and the orientation of the axes of collars 38 and 39 permits relative pivotal movement of the bushings within these collars relative to the shaft surrounded thereby when the amount of movement is greater than that accommodated by the frictional engagement of the bushings on the shafts. Each of the bushings is therefore oriented to accommodate the greatest movement exerted thereon by pivoting about the shaft on which it is mounted rather than merely distorting. However, the resilient nature of the bushings permit them to accommodate other movements due to the floating action of the cutter bar 14 by distortion of the bushings within the mechanical limits imposed by the mounting arrangement illustrated.

The peculiar mounting of the bushings and their orientation relative to the parts to which they are connected provides a long life to the bushings, since the greatest amount of movement will be accommodated by a turning motion rather than deflection. In this manner, a carefully controlled degree of freedom of movement of the various parts is insured, while protecting the coupling bushings from damage due to forces greater than those that can be reasonably accommodated by distortion of the bushing material.

Various modifications might be made with regard to the particular structures illustrated in order to accommodate this concept to structurally different harvesters with modified cutter bar arrangements. The detailed description given above is not intended to define or limit the scope of this invention, which is set out in the following claims. It is to be understood that equivalent devices and materials can be substituted in this combination without deviating from the intended scope of these claims.

Having thus described my invention, I claim:

1. In a cutter bar assembly on a farm implement:
   a mobile supporting framework;
   a cutter bar apparatus mounted transversely across the front of said framework for vertical movement relative to the framework;
   a sickle mounted on said cutter bar for transverse motion relative to said cutter bar apparatus;
   movable drive means on said framework;
   a pitman pivotally connected at one end to said movable drive means and at its remaining end to said sickle, each of said pivotal connections being through a resilient bushing affording limited twisting movement; and
   an elongated stabilizer bar positioned transversely in front of said framework with one end pivotally connected to said framework and the other end pivotally connected to said cutter bar apparatus for limiting the transverse movement of the cutter bar, each of said last named connections being through a resilient bushing affording twisting movement.

2. The apparatus as defined in claim 1 wherein each bushing is a tubular cylindrical bushing interposed between an outer collar and an inner shaft fixed respectively to the elements connected thereby.

3. The apparatus as defined in claim 1 wherein each bushing is a tubular cylindrical bushing interposed between an outer collar and an inner shaft fixed respectively to the elements controlled thereby;
   the axes of said bushings connecting said pitman being substantially vertical and the axes of said bushings connecting said stabilizer being substantially horizontal.

4. An apparatus as defined in claim 1 wherein both the pitman and the stabilizer bar are positioned in front of the framework with their longitudinal axes transverse to the framework.

5. In a drive mechanism for a floating cutter bar mounted across the front end of a mobile framework having a movable driving element at the side of the framework and a transversely reciprocable sickle, and a pitman operatively connected between the driving element and the sickle;
   an elongated stabilizer bar positioned transversely across the front of the framework with one end pivotally connected to the framework and the other end pivotally connected to the cutter bar, at least one of the connections being through a resilient bushing.

6. The apparatus as defined in claim 5 wherein the pivotal connections at the respective ends of said stabilizer bar are mounted on parallel axes extending along the intended direction of travel of the framework.

7. In a cutter bar assembly at the front end of a farm implement frame having a transversely movable driving element at one side of the frame;
   a transversely oriented floating cutter bar mounted on the frame for elevational movement relative to the frame;
   a transversely reciprocable sickle extending across the width of said cutter bar;
   a rigid pitman extending a substantial distance across said cutter bar and having one end thereof pivotally connected to the movable driving element at the side of the frame and the remaining end thereof pivotally connected to the sickle, each connection comprising a cylindrical collar fixed rigidly to the pitman, a tubular resilient bushing having the outer cylindrical surface thereof fixed within the collar, and a shaft fixed to the driving element or sickle respectively, said shaft being frictionally engaged within said bushing coaxially with the collar fixed thereto;

a rigid stabilizer bar extending a substantial distance transversely across the front of said implement frame and having one end thereof pivotally connected to the implement frame and the remaining end thereof pivotally connected to the cutter bar for limiting the transverse movement of the cutter bar, each connection comprising a cylindrical collar fixed rigidly to the stabilizer bar, a tubular resilient bushing having the outer cylindrical surface thereof fixed within the collar, and a shaft fixed to the frame or cutter bar respectively, said shaft being frictionally engaged within said bushing coaxially with the collar fixed thereto.

8. The apparatus as defined in claim 7 wherein each bushing is a tubular cylindrical bushing interposed between an outer collar and an inner shaft fixed respectively to the elements controlled thereby; the axes of said bushings connecting said pitman being substantially vertical and the axes of said bushings connecting said stabilizer being substantially horizontal.

References Cited
UNITED STATES PATENTS

| | | |
|---|---|---|
| 131,671 | 9/1872 | Eils. |
| 568,146 | 9/1896 | Schreffler _____ 56—260 |
| 1,996,294 | 4/1935 | Hume et al. _____ 56—181 |
| 2,099,471 | 11/1937 | Edgington _____ 56—181 X |
| 2,238,197 | 4/1941 | Watson _____ 308—238 X |
| 2,691,863 | 10/1954 | Krause _____ 56—296 |
| 2,795,922 | 6/1957 | Hume _____ 56—257 |

ABRAHAM G. STONE, *Primary Examiner.*

P. A. RAZZANO, *Assistant Examiner.*